(12) United States Patent
M'Sadoques et al.

(10) Patent No.: US 7,298,606 B2
(45) Date of Patent: Nov. 20, 2007

(54) APPARATUS FOR INTERFACING REMOTE OPERATED AND NON-REMOTE OPERATED CIRCUIT BREAKERS WITH AN ELECTRICAL PANEL

(75) Inventors: Andre Joseph M'Sadoques, Southington, CT (US); Joseph G. Nagy, Southington, CT (US); Dennis Zuffelato, Kensington, CT (US); Yatin Vilas Newase, Maharashtra (IN)

(73) Assignee: General Electric Company, Schenectady, NY (US)

( * ) Notice: Subject to any disclaimer, the term of this patent is extended or adjusted under 35 U.S.C. 154(b) by 281 days.

(21) Appl. No.: 10/907,223

(22) Filed: Mar. 24, 2005

(65) Prior Publication Data

US 2005/0213289 A1 Sep. 29, 2005

Related U.S. Application Data

(60) Provisional application No. 60/557,226, filed on Mar. 29, 2004.

(51) Int. Cl.
*H02B 1/26* (2006.01)
(52) U.S. Cl. .................. 361/644; 361/637; 361/634
(58) Field of Classification Search ................ 361/627, 361/628, 634, 644, 647, 652, 656, 673, 637, 361/631, 636, 648, 655, 635
See application file for complete search history.

(56) References Cited

U.S. PATENT DOCUMENTS

| | | | | |
|---|---|---|---|---|
| 4,642,733 A | * | 2/1987 | Schacht | 361/656 |
| 4,667,268 A | * | 5/1987 | Mrowka | 361/634 |
| 4,679,016 A | | 7/1987 | Ciarcia | |
| 4,752,233 A | * | 6/1988 | Morby et al. | 439/212 |
| 5,046,173 A | * | 9/1991 | Wall, Jr. | 361/634 |
| 5,640,294 A | * | 6/1997 | Caggiano et al. | 361/637 |

\* cited by examiner

*Primary Examiner*—Gregory D Thompson
(74) *Attorney, Agent, or Firm*—Cantor Colburn LLP (57) ABSTRACT

A multi-pole mounting base for interfacing a circuit breaker and/or circuit interrupter with an electrical panel is disclosed. The electrical panel has an interior configured to receive remote operated circuit breakers (ROCBs) in signal communication with a communication board internal to the electrical panel, non-ROCBs, and ground fault circuit interrupters (GFCIs). The mounting base includes a unitary support platform assemblable to the interior of the electrical panel and having first mounting regions with common structure configured to receive any one of the ROCBs, the non-ROCBs, and the GFCIs. The support platform also has second mounting regions configured to receive the communication board. The support platform is configured to assemble adjacent to another support platform in the electrical panel.

14 Claims, 8 Drawing Sheets

APPARATUS FOR INTERFACING REMOTE OPERATED AND NON-REMOTE OPERATED CIRCUIT BREAKERS WITH AN ELECTRICAL PANEL

CROSS REFERENCE TO RELATED APPLICATIONS

This application claims the benefit of U.S. Provisional Application Ser. No. 60/557,226, filed Mar. 29, 2004, which is incorporated herein by reference in its entirety.

BACKGROUND OF THE INVENTION

The present disclosure relates generally to electrical panels, and particularly to the installation of remote operated and non-remote operated circuit breakers in electrical panels.

Electrical panels typically house a plurality of circuit breakers that distribute power from a source to a plurality of loads while providing protection to the load circuits. The electrical panels may be single-phase, or three-phase with switching neutral for example, may have a variety of voltage ratings, such as 120 Vac to 600 Vac for example, and may have a variety of current ratings, such as 125 Amps to 400 Amps for example, thereby enabling the electrical panels to serve a variety of applications. One such application is a lighting panel, which may be used to service lighting loads in a commercial building having a plurality of lighting circuits. To facilitate the efficient utilization of power in such commercial buildings, remote operated circuit breakers (ROCBs) may be employed that enable the lighting loads to be turned on and off from a location remote to the electrical panel or from within the electrical panel. However, not all lighting loads may require a ROCB, and some of the load circuits may require a ground fault circuit interrupter (GFCl). Accordingly, there is a need in the art for an electrical panel that may be readily adapted to accept a variety of circuit breakers, and particularly that may be readily adapted to accept ROCBs, non-ROCBs, and GFCls.

BRIEF DESCRIPTION OF THE INVENTION

An embodiment of the invention includes a multi-pole mounting base for interfacing a circuit breaker and/or circuit interrupter with an electrical panel. The electrical panel has an interior configured to receive remote operated circuit breakers (ROCBs) in signal communication with a communication board internal to the electrical panel, non-ROCBs, and ground fault circuit interrupters (GFCls). The mounting base includes a unitary support platform assemblable to the interior of the electrical panel and having first mounting regions with common structure configured to receive any one of the ROCBs, the non-ROCBs, and the GFCls. The support platform also has second mounting regions configured to receive the communication board. The support platform is configured to assemble adjacent to another support platform in the electrical panel.

Another embodiment of the invention includes a multi-pole mounting base for interfacing a circuit breaker and/or circuit interrupter with an electrical panel. The electrical panel has an interior configured to receive remote operated circuit breakers (ROCBs) in signal communication with a communication board internal to the electrical panel, non-ROCBs, and ground fault circuit interrupters (GFCls). The mounting base includes a unitary support platform assemblable to the interior of the electrical panel and having first mounting regions with common structure configured to receive any one of the ROCBs, the non-ROCBs, and the GFCls. Each first mounting region is configured to receive a mounting adapter to securely couple a non-ROCB to the mounting base, and includes a removable rejection feature configured to reject the installation of a GFCl. The support platform also has second mounting regions configured to receive the communication board. The support platform is configured to assemble adjacent to another support platform in the electrical panel.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a multi-pole mounting base for interfacing circuit breakers and/or circuit interrupters with an electrical panel. The electrical panel has an interior configured to receive remote operated circuit breakers (ROCBs), non-ROCBs, and ground fault circuit interrupters (GFCls). Each ROCB includes a communication port at its load end, which is configured to mate with a communication port at a communication board when both a ROCB and a communication board are installed in the electrical panel. Inside the electrical panel is a plurality of busbars for distributing electrical power from a source to a plurality of electrical loads via the aforementioned circuit breakers and/or circuit interrupters.

Figure 1:
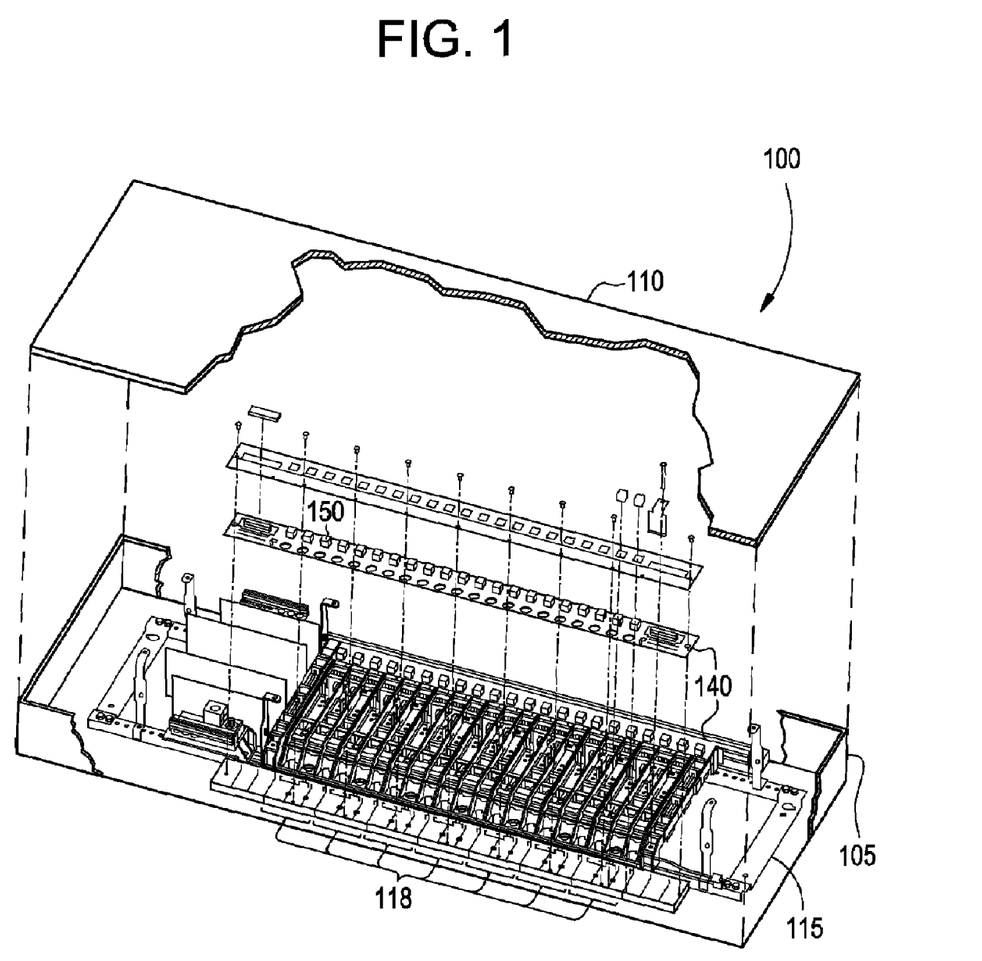
FIG. 1 depicts in isometric view a partially exploded assembly of an electrical panel in accordance with an embodiment of the invention.

FIG. 1 is an exemplary embodiment of an electrical panel 100 having an enclosure 105, a cover 110, and an interior 115. The interior 115 is configured to receive a plurality of mounting bases 118, which is best seen by now referring to FIG. 2.

Figure 2:
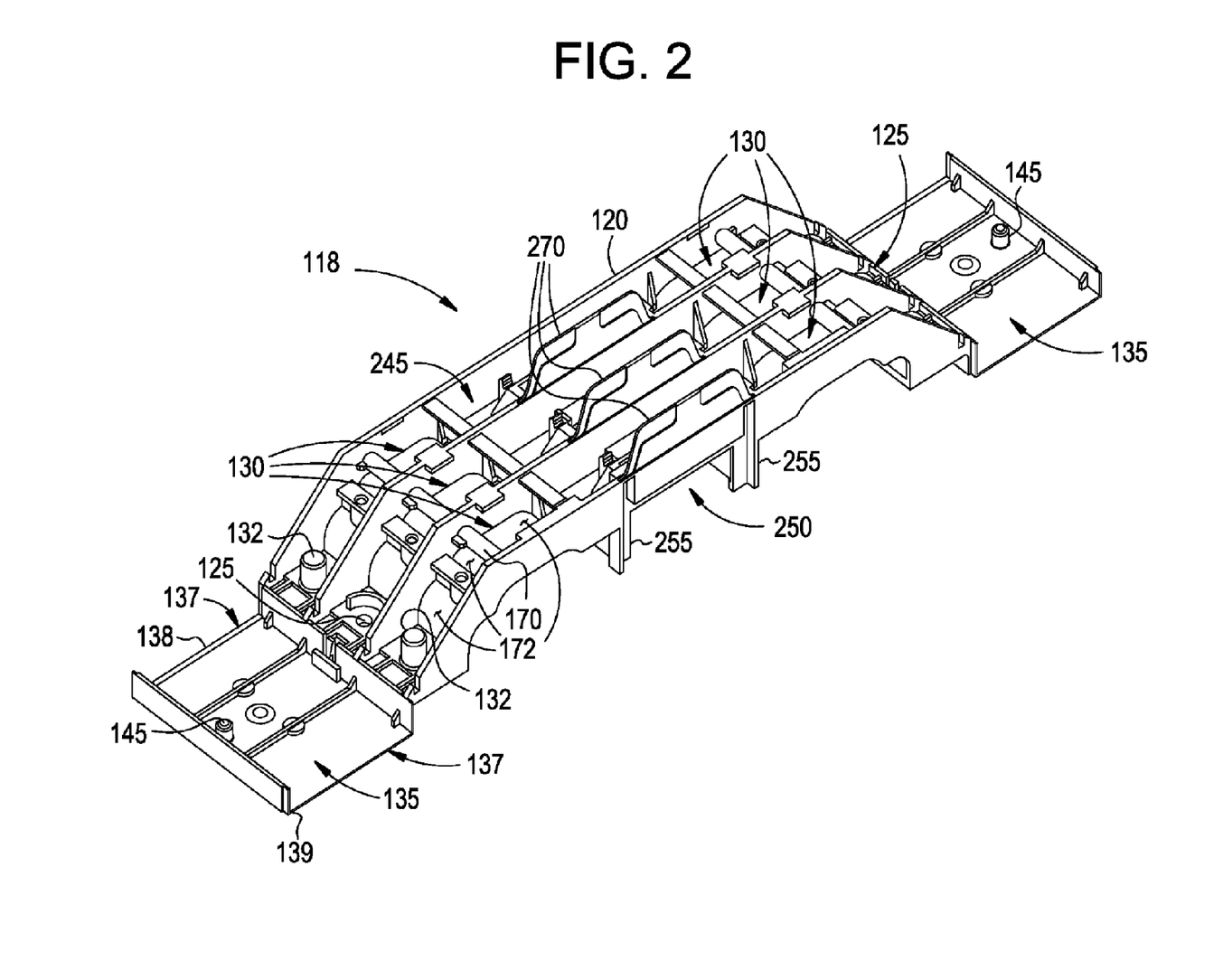
FIG. 2 depicts in isometric view an exemplary mounting base in accordance with an embodiment of the invention.

With reference to FIG. 2, each mounting base 118 provides a support platform 120 that is a unitary structure assemblable to the interior 115 via securing details 125, and is configured to receive ROCBs, non-ROCBs, and GFCIs, at any one of a first mounting region 130. In an embodiment, mounting base 118 is molded as a single unit out of a plastic suitable for electrical applications. As depicted in FIG. 1, each support platform 120 is configured to assemble adjacent another support platform 120 in the electrical panel 100. In an embodiment, support platform 120 has six mounting regions 130 arranged in a three-by-two array configured to accept two three-phase circuit breakers mounted face-to-face (line side facing line side) with each other. Each first mounting region 130 has common mounting structure that enables ROCBs, non-ROCBs, and GFCIs, to be interchangeable within a given first mounting region 130. Support platform 120 also includes a second mounting region 135 configured to receive a communication board 140, which is depicted in FIG. 1 as part of the assembly on the far side of panel 100, and in an exploded assembly state on the near side of panel 100. Second mounting region 135 includes a locating feature 145 configured to mate with matching detail (not shown) on communication board 140 to align the communication ports 150 on the communication board 140 with the communication ports 155 on a ROCB 160, best seen by referring to FIG. 3. In an embodiment, second mounting region 135 includes overlapping edges 137 formed by a first edge 138 having a thinned down bottom surface, and a second edge 139 having a thinned down top surface, thereby providing a continuous channel that provides electrical isolation to ground when communication board 140 is mounted at a plurality of adjacently arranged second mounting regions 135.

Figure 11:
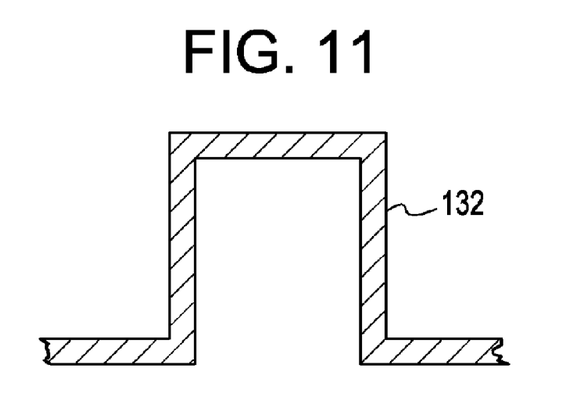
FIG. 11 depicts a cross section view of a portion of the mounting base of FIGS. 2 and 7.

In an embodiment, at least two of the three first mounting regions 130 on one side of mounting base 118 have integrally arranged blind holes 132 configured to receive mounting hardware (not shown) from the underside associated with the electrical panel 100, and to electrically isolate the mounting hardware from the ROCB mounted at first mounting region 130. An expanded cross-section view of blind hole 132 is depicted in FIG. 11.

Figure 3:
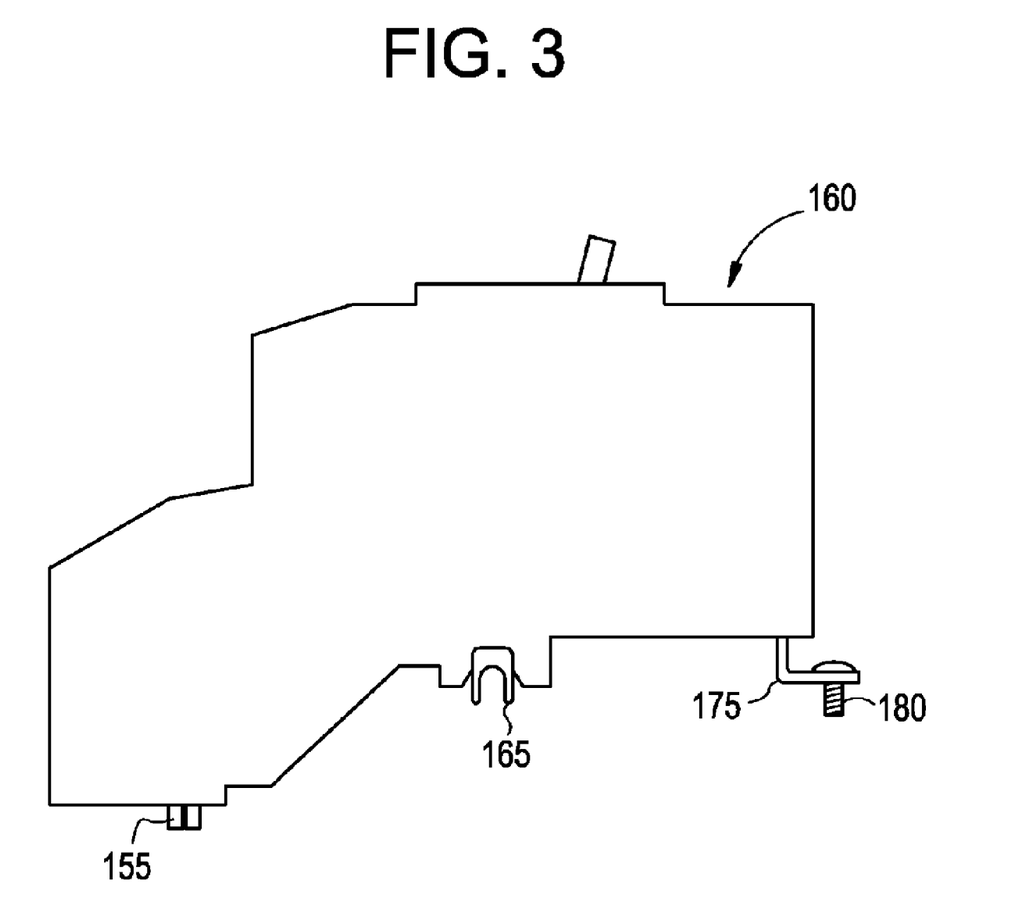
FIG. 3 depicts in side view an exemplary remote operated circuit breaker (ROCB) for use in accordance with an embodiment of the invention.

In an embodiment, and referring now back to FIGS. 1-3, the ROCB 160 mounts to a first mounting region 130 of support platform 120 by way of a clip 165 engaging with a catch 170, which in an embodiment has a barrel shape that is accessible from above or below via molded-in openings 172. While only one reference numeral 170 is illustrated in FIG. 2, it will be appreciated that this is for clarity only and that features common to each first mounting region 130 may be represented by way of illustration only. ROCB 160 also includes a line strap 175 having a mounting screw 180, which provides electrical connection to a busbar at interior 115 in a manner known in the art.

Figure 4:
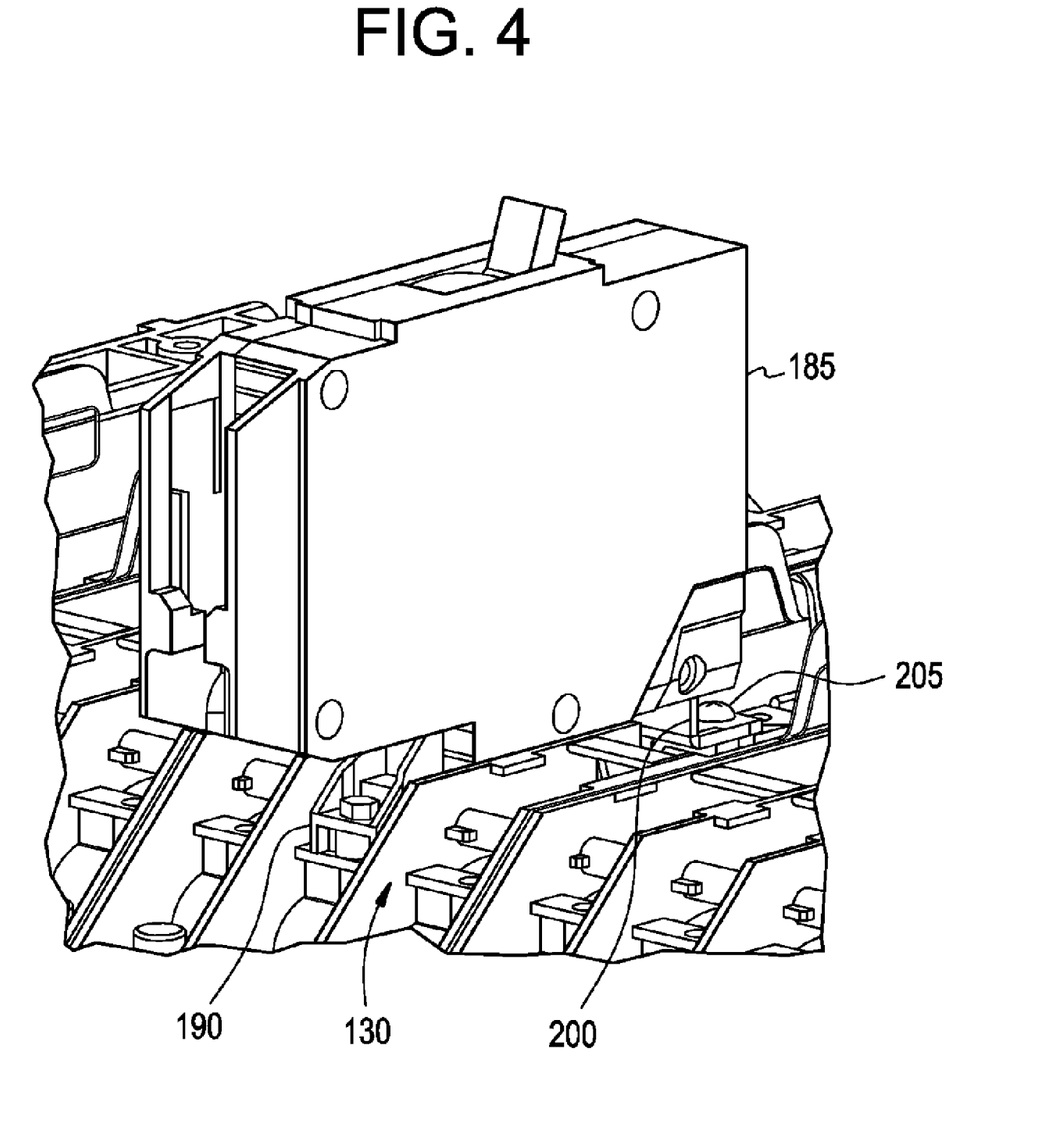
FIG. 4 depicts in isometric view an exemplary non-ROCB assembled to a mounting base in accordance with an embodiment of the invention.
Figure 5:
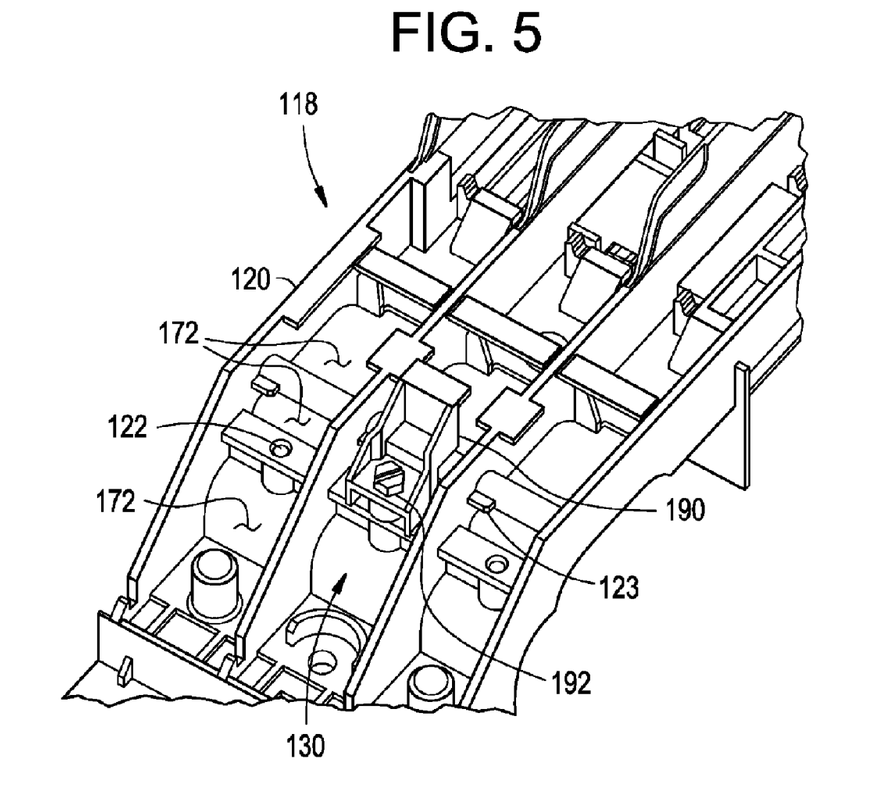
FIG. 5 depicts in isometric view a modification of the mounting base of FIG. 2 in accordance with an embodiment of the invention.
Figure 6:
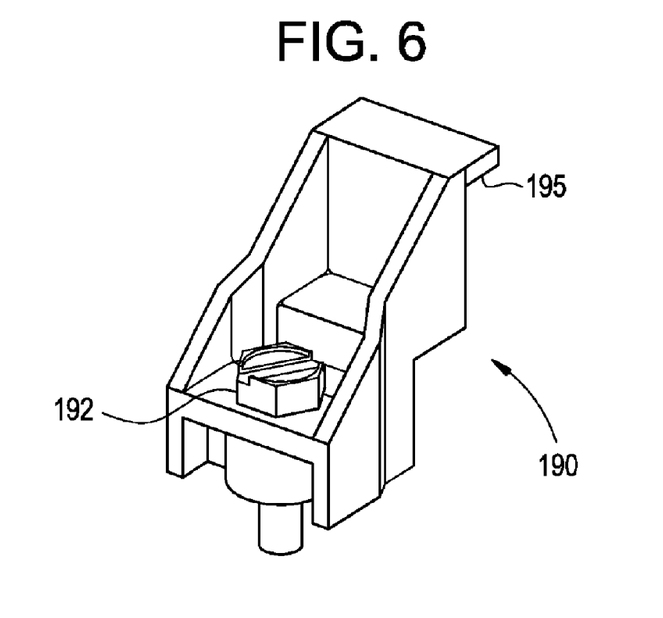
FIG. 6 depicts in isometric view a means for adapting the mounting base of FIG. 2 in accordance with an embodiment of the invention.
Figure 7:
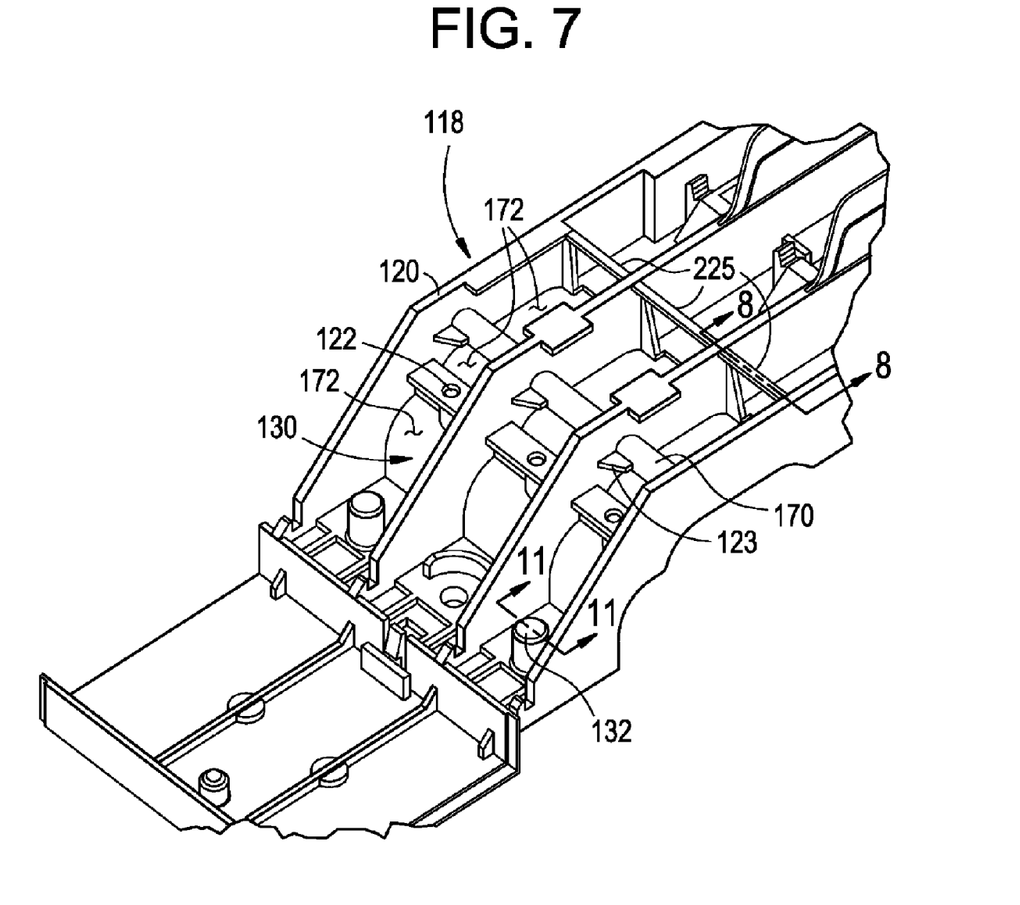
FIG. 7 depicts in isometric view a partial view of the mounting base of FIG. 2.

Referring now to FIGS. 4-6, a non-ROCB 185 may be mounted to any one of first mounting regions 130 via a mounting adapter 190 (see FIG. 6 for an expanded view of mounting adapter 190). In an embodiment, mounting adapter 190 is secured to support platform 120 via mounting hardware 192 and pilot hole 122, and includes a tab 195 that engages with a pocket (not shown but known in the art) at the load end of non-ROCB 185, thereby securely coupling the load end of non-ROCB 185 to the mounting base 118. The line end of non-ROCB 185 includes a line strap 200 having a mounting screw 205, which are similar to and similar in function to that of line strap 175 and mounting screw 180.

Figure 8:
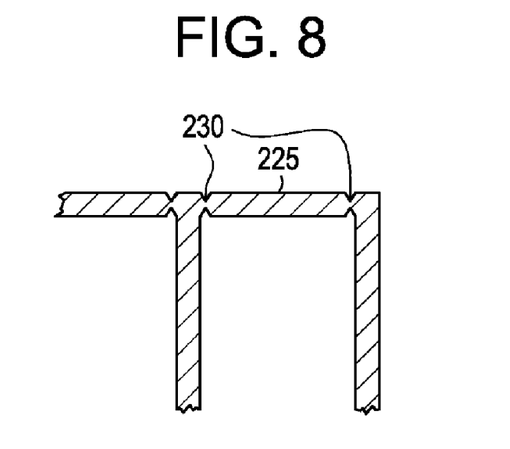
FIG. 8 depicts a cross section view of a portion of the mounting base of FIGS. 2 and 7.
Figure 9:
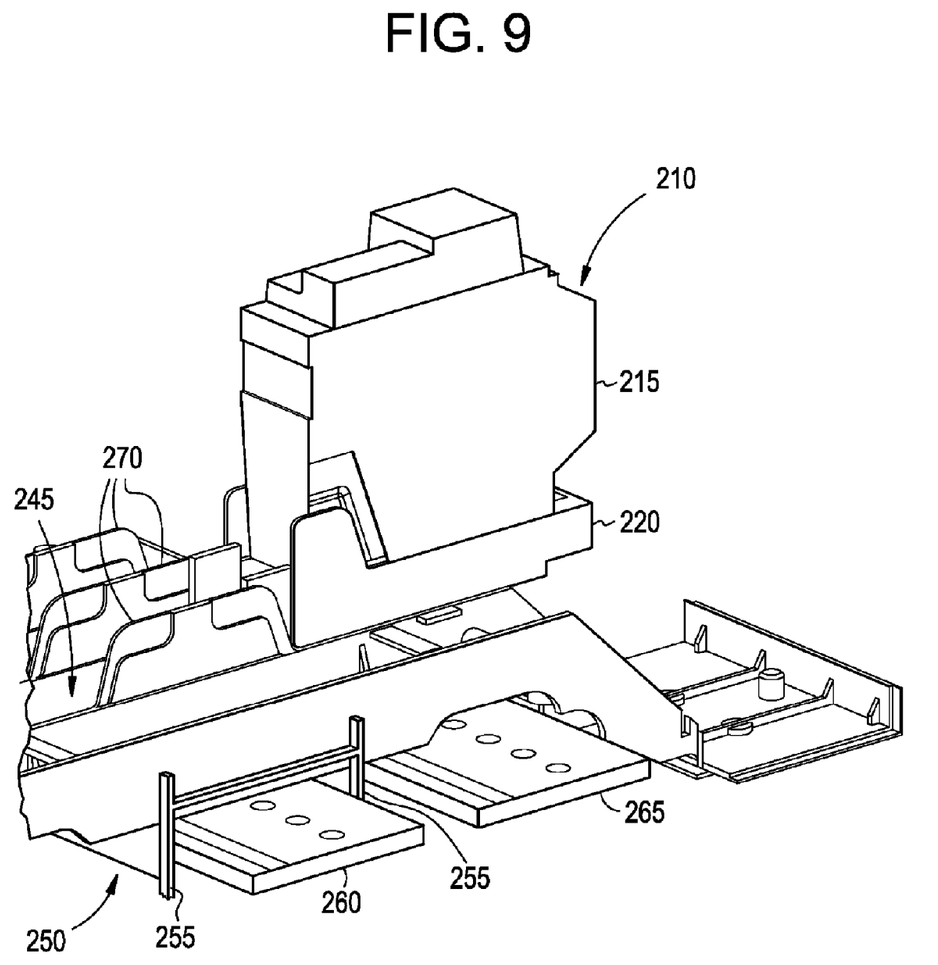
FIG. 9 depicts in isometric view an exemplary ground fault circuit interrupter GFCl assembled to a mounting base in accordance with an embodiment of the invention.
Figure 10:
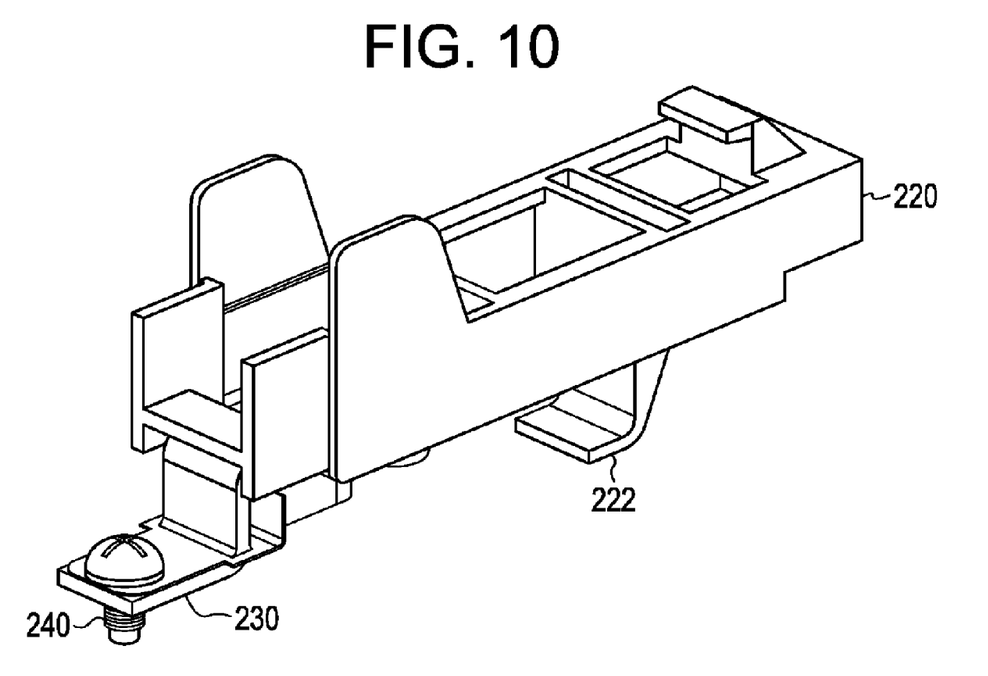
FIG. 10 depicts in isometric view an exemplary GFCl adapter for use in accordance with an embodiment of the invention.

Referring now to FIGS. 7-10, a GFCI 210, depicted in FIG. 9 as a unit having a GFCI device 215 engaged with a GFCI adapter 220, may be mounted to any one of first mounting regions 130 by first removing a removable rejection feature 225 that is integrally arranged with support platform 120. FIG. 8 depicts a cross-section view through removable rejection feature 225, which includes webs 230 of reduced thickness for providing a defined breakaway. As depicted in FIG. 10, GFCI adapter 220 includes a hook 222 for engaging under barrel-shaped catch 170 that is integrally arranged with support platform 120, and a line strap 235 having a mounting screw 240, which are similar to and similar in function to that of line strap 175 and mounting screw 180. In an embodiment, the removable rejection feature 225 serves to reject the installation of the GFCI 210 if the rejection feature 225 is present, and serves to accept the installation of the GFCI 210 if the rejection feature 225 is absent, thereby serving to reject the installation of GFCI 210 as desired.

Referring now to FIGS. 2 and 9 together, support platform 120 may be viewed as having a first side 245 and a second opposite side 250, where first side 245 has first mounting regions 130 formed thereat, and second side 250 has a pair of walls 255 formed thereat. As depicted in FIG. 9, walls 255 are configured to straddle a busbar 260, thereby providing electrical isolation between busbars 260 and 265 that are installed in a known manner in electrical panel 100. At first side 245, an embodiment of support platform 120 also has integrally arranged isolation walls 270 that serve to provide electrical isolation between adjacent phases.

In an embodiment, barrel-shaped catch 170 includes a multi-functional tab 123 (see FIGS. 5 and 7 for example) integrally formed at each end, which serve to strengthen catch 170 by acting as a gusset, guide the insertion of hook 222 during the assembly of GFCI adapter 220 to mounting base 118, and provide an anti-torque feature when mounting adapter 190 is installed.

While an embodiment of the invention has been described employing a mounting base 118 having a six-pole, three-phase configuration, it will be appreciated that the scope of the invention is not so limited, and that the invention may also apply to other configurations, such as a twelve-pole, three-phase configuration, or a two-pole, single-phase configuration, for example.

As disclosed, some embodiments of the invention may include some of the following advantages: a modular mounting base for an electrical panel that readily adapts to accept the installation of one of many circuit breaker configurations, and is especially adaptable to accept the installation of ROCBs, non-ROCBs, and GFCIs; an arrangement of multiple identical modular mounting bases for an electrical panel that provide a channel for a ROCB communication board on either or both sides of the electrical panel; a mounting means for a printed circuit board that can communicate from a panel-mounted ROCB to a panel-mounted printed circuit board controller (not shown); a mounting means that may be used to adapt a standard GFCI to be panel-mounted for 240 Volt application and be rejected for 480 Volt application; a mounting means that is adaptable to accept ROCBs, non-ROCBs, and GFCIs, in the same electrical panel; and, a mounting means that provide self alignment between the communication ports of the communication board and the communication ports of the ROCBs.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A multi-pole mounting base for interfacing a circuit breaker and/or circuit interrupter with an electrical panel, the electrical panel having an interior configured to receive remote operated circuit breakers (ROCBs) in signal communication, via communication ports, with a communication board internal to the electrical panel, non-ROCBs, and ground fault circuit interrupters (GFCIs), the interior of the electrical panel having a plurality of busbars, the mounting base comprising:

a unitary support platform assemblable to the interior of the electrical panel and having a plurality of first mounting regions, each first mounting region having common structure configured to receive any one of the ROCBs, the non-ROCBs, and the GFCIs;

the support platform having a second mounting region configured to receive the communication board, the second mounting region comprising a locating feature configured to align communication ports on the communication board with communication ports on the ROCBs; and the support platform being configured to assemble adjacent to another support platform in the electrical panel.

2. The mounting base of claim 1, wherein:

each first mounting region is further configured to receive a mounting adapter to securely couple a non-RQCB to the mounting base.

3. The mounting base of claim 1, wherein:

each first mounting region comprises a removable rejection feature that serves to reject the installation of a GFCL.

4. The mounting base of claim 3, wherein:

the removable rejection feature serves to reject the installation of the GFCI if the rejection feature is present, and serves to accept the installation of the GFCI if the rejection feature absent.

5. The mounting base of claim 1, wherein:

the support platform comprises, on a side opposite to that of the first mounting regions, a pair of walls configured to straddle one of the busbars.

6. The mounting base of claim 1, wherein:

the unitary support platform is a unitary three-phase support platform.

7. The mounting base of claim 6, wherein:

the unitary support platform is a unitary six-pole support platform.

8. The mounting base of claim 1, wherein:

the second mounting region comprises overlapping edges configured to overlap another second mounting region of another support platform assembled adjacent thereto at the interior of the electrical panel.

9. The mounting base of claim 6, wherein:

the unitary support platform further comprises integrally arranged isolation walls disposed to isolate between adjacent phases.

10. The mounting base of claim 6, wherein:

at least two of the first mounting regions comprise an integrally arranged blind hole configured to receive mounting hardware associated with the electrical panel and to electrically isolate the mounting hardware from the ROCB.

11. A multi-pole mounting base for interfacing a circuit breaker and/or circuit interrupter with an electrical panel, the electrical panel having an interior configured to receive remote operated circuit breakers (ROCBs) in signal communication, via communication ports, with a communication board internal to the electrical panel, non-ROCBs, and ground fault circuit interrupters (GFCIs), the interior of the electrical panel having a plurality of busbars, the mounting base comprising:

a unitary support platform assemblable to the interior of the electrical panel and having a plurality of first mounting regions, each first mounting region having common structure configured to receive any one of the ROCBs, the non-ROCBs, and the GECIs, each first mounting region configured to receive a mounting adapter to securely couple a non-ROCB to the mounting base, each first mounting region comprising a removable rejection feature configured to reject the installation of a GFCI;

the support platform having a second mounting region configured to receive the communication board; and the support platform being configured to assemble adjacent to another support platform in the electrical panel.

12. The mounting base of claim 11, wherein the second mounting region comprises:

a locating feature configured to align communication ports on the communication board with communication ports on the ROCBs; and overlapping edges configured to overlap another second mounting region of another support platform assembled adjacent thereto at the interior of the electrical panel.

13. The mounting base of claim 11, wherein:

the unitary support platform is a unitary six-pole, three-phase support platform.

14. The mounting base of claim 11, wherein:

each first mounting region comprises and anti-torque feature configured to resist an applied torque at the mounting adapter.

* * * * *